Patented Jan. 4, 1949

2,458,453

UNITED STATES PATENT OFFICE 2,458,453

PROCESS FOR PRODUCING THIAMIN DERIVATIVES

Kurt Warnat, Basel, Switzerland, assignor to Hoffmann-La Roche Inc., Nutley, N. J., a corporation of New Jersey No Drawing. Application April 9, 1946, Serial No. 660,857. In Switzerland June 1, 1945

1 Claim. (Cl. 260—251)

This invention relates to the manufacture of a thiamin derivative.

It is known that thiochrome is formed if potassium ferric cyanide is caused to act on an alkaline solution of aneurin. This reaction is used for the analytical determination of thiamin (c. f. Gstirner "Chemische Vitamin-Bestimmungsmethoden," 3rd edition, year 1941, page 68, et seq., where further literature references are to be found, e. g. "Berichte der Deutschen Chemischen Gesellschaft," vol. 68, year 1935, page 2257).

Surprisingly enough it has now been found, according to the present invention, that the compound of the following formula is obtained in predominant quantity upon acting potassium ferric cyanide on the alkaline transformation product of thiamin in concentrated solution:

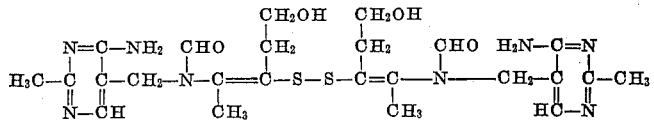

In order to attain as far as possible complete formation of the said compound, which is described in German Patent Specification No. 749,149, it is of advantage to provide for the reaction solution always to contain at least 8 per cent of organic substance until the reaction is terminated; with increasing dilution of the reaction mixture, the quantity of the thiochrome formed as a by-product increases too.

The disulfide manufactured in accordance with the present invention is to be employed as a medicinal preparation.

Example 1

10 parts by weight of thiamin are dissolved in 15 parts of water, a cold solution of 3.7 parts by weight of caustic soda in 20 parts of water added and the mixture oxidised with a solution of 10 parts by weight of potassium ferric cyanide in 40 parts of water while stirring in the cold. The liquid is then evaporated to dryness in vacuo and the oxidation product extracted with warm butyl alcohol. The butyl-alcoholic solution is evaporated in vacuo and the crystalline residue dissolved with gentle heating in 25 parts by volume of methyl alcohol. 200 parts by volume of acetone are added, a small quantity of undissolved material immediately filtered off and the filtrate allowed to crystallize. Yield 5.8 parts by weight of the pure product. Melting point of the dry substance: 177–179° C.

Example 2

20 parts by weight of thiamin are dissolved in 25 parts of water, a cold solution of 5 parts by weight of caustic soda in 25 parts of water added and the mixture oxidized with a solution of 2.4 parts by weight of caustic soda and 20 parts by weight of potassium ferric cyanide in 80 parts of water while stirring in the cold. The liquid is then evaporated to dryness in vacuo and the oxidation product extracted with warm butyl alcohol. The butyl-alcoholic solution is evaporated in vacuo and the residue dissolved with gentle heating in 25 parts by volume of methyl alcohol. 100 parts by volume of acetone are added, the solution filtered and further quantities of acetone added, whereupon crystallization sets in. Yield: 12.2 parts by weight of the pure product, having the melting point 177–179° C.

What I claim is:

A process which comprises mixing and reacting one mol of thiamin with three mols of caustic soda and mixing and reacting the thiamin sodium salt thus obtained with one mol of potassium ferricyanide so as to produce a compound of the following formula:

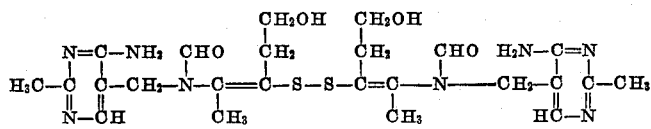

while maintaining at least 8 per cent of organic substance in the reaction mixture throughout the reaction, said organic substance being that supplied by the aforementioned sodium salt and the final reaction product.

KURT WARNAT.

No references cited.